US011357026B2

(12) United States Patent
Joseph et al.

(10) Patent No.: US 11,357,026 B2
(45) Date of Patent: Jun. 7, 2022

(54) SIGNALING AND MEDIUM ACCESS CONTROL OPTIONS FOR PREEMPTED SCHEDULING REQUESTS

(71) Applicant: QUALCOMM Incorporated, San Diego, CA (US)

(72) Inventors: Vinay Joseph, Calicut KER (IN); Rajat Prakash, San Diego, CA (US); Linhai He, San Diego, CA (US); Peter Gaal, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/893,196

(22) Filed: Jun. 4, 2020

(65) Prior Publication Data
US 2020/0389911 A1     Dec. 10, 2020

Related U.S. Application Data

(60) Provisional application No. 62/858,131, filed on Jun. 6, 2019.

(51) Int. Cl.
*H04W 72/12*     (2009.01)
*H04W 48/06*     (2009.01)
(Continued)

(52) U.S. Cl.
CPC ......... *H04W 72/1263* (2013.01); *H04W 4/06* (2013.01); *H04W 48/06* (2013.01); *H04W 80/02* (2013.01)

(58) Field of Classification Search
CPC ... H04W 72/1263; H04W 48/06; H04W 4/06; H04W 80/02; H04W 72/1284; H04W 72/1242; H04L 47/245
See application file for complete search history.

(56) References Cited

U.S. PATENT DOCUMENTS 9,065,545 B2 *   6/2015   Earnshaw ............. H04L 1/1854
2016/0157256 A1 *   6/2016   Tseng ................ H04W 28/0278
                                                                 370/329
(Continued)

OTHER PUBLICATIONS

Interdigital Inc: "Potential Enhancements for UL Inter-UE Multiplexing", 3GPP Draft, 3GPP TSG RAN WG1 #96, R1-1902610 Potential Enhancements for UL Inter-UE Multiplexing, 3rd Generation Partnership Project (3GPP), Mobile Competence Centre, 650, Route Des Lucioles, F-06921 Sophia-Antipolis Ced, vol. RAN WG1, No. Athens, Greece, Feb. 25, 2019-Mar. 1, 2019, Feb. 16, 2019 (Feb. 16, 2019), XP051600303, 6 Pages. Retrieved from the Internet: URL: http://www.3gpp.org/ftp/tsg%5Fran/WG1%5FRL1/TSGR1%5F96/Docs/R1 %2D1902610%2Ezip, [retrieved on Feb. 16, 2019], p. 5, line 6-p. 5, line 11.
(Continued)

*Primary Examiner* — Afshawn M Towfighi
(74) *Attorney, Agent, or Firm* — Harrity & Harrity LLP/Qualcomm Incorporated (57) ABSTRACT

Various aspects of the present disclosure generally relate to wireless communication. In some aspects, a user equipment may determine that processing or transmission associated with a scheduling request is preempted, and perform one or more scheduling request preemption actions, associated with the scheduling request, based at least in part on determining that the processing or transmission is preempted. Numerous other aspects are provided.

32 Claims, 4 Drawing Sheets

(51) Int. Cl.
*H04W 4/06* (2009.01)
*H04W 80/02* (2009.01)

(56) References Cited

U.S. PATENT DOCUMENTS

| | | | | |
|---|---|---|---|---|
| 2018/0124831 A1* | 5/2018 | Dinan | ................ | H04L 41/0813 |
| 2018/0368012 A1* | 12/2018 | Wei | ................ | H04W 72/1278 |
| 2019/0313462 A1* | 10/2019 | Lin | ................ | H04W 72/1284 |
| 2020/0068601 A1* | 2/2020 | Wang | ................ | H04W 72/14 |
| 2021/0007147 A1* | 1/2021 | Yang | ................ | H04W 74/0808 |

OTHER PUBLICATIONS

International Search Report and Written Opinion—PCT/US2020/036347—ISAEPO—dated Sep. 3, 2020.

Mitsubishi Electric: "Views on Pre-Emption for UL Inter/Intra UE Tx Multiplexing", 3GPP Draft, 3GPP TSG RAN WG1 Ad-Hoc Meeting, R1-1900639-AH1_URLLC_MITBS_B, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593486, 8 Pages, Retrieved from the Internet: URL: http://www.3gpp.org/ftp/Meetings%5F3GPP%5FSYNC/RAN1/Docs/R1%2D1900639%2Ezip, [retrieved on Jan. 20, 2019], Section 3.2.

* cited by examiner

SIGNALING AND MEDIUM ACCESS CONTROL OPTIONS FOR PREEMPTED SCHEDULING REQUESTS

CROSS-REFERENCE TO RELATED APPLICATION

This Patent application claims priority to U.S. Provisional Patent Application No. 62/858,131, filed on Jun. 6, 2019, entitled "SIGNALING AND MEDIUM ACCESS CONTROL OPTIONS FOR PREEMPTED SCHEDULING REQUESTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for signaling and medium access control (MAC) options for preempted scheduling requests.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that processing or transmission associated with a scheduling request is preempted; and performing one or more scheduling request preemption actions, associated with the scheduling request, based at least in part on determining that the processing or transmission is preempted.

In some aspects, a UE for wireless communication may include memory and one or more processors operatively coupled to the memory. The memory and the one or more processors may be configured to determine that processing or transmission associated with a scheduling request is preempted; and perform one or more scheduling request preemption actions, associated with the scheduling request, based at least in part on determining that the processing or transmission is preempted.

In some aspects, a non-transitory computer-readable medium may store one or more instructions for wireless communication. The one or more instructions, when executed by one or more processors of a UE, may cause the one or more processors to: determine that processing or transmission associated with a scheduling request is preempted; and perform one or more scheduling request preemption actions, associated with the scheduling request, based at least in part on determining that the processing or transmission is preempted.

In some aspects, an apparatus for wireless communication may include means for determining that processing or transmission associated with a scheduling request is preempted; and means for performing one or more scheduling request preemption actions, associated with the scheduling request, based at least in part on determining that the processing or transmission is preempted.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
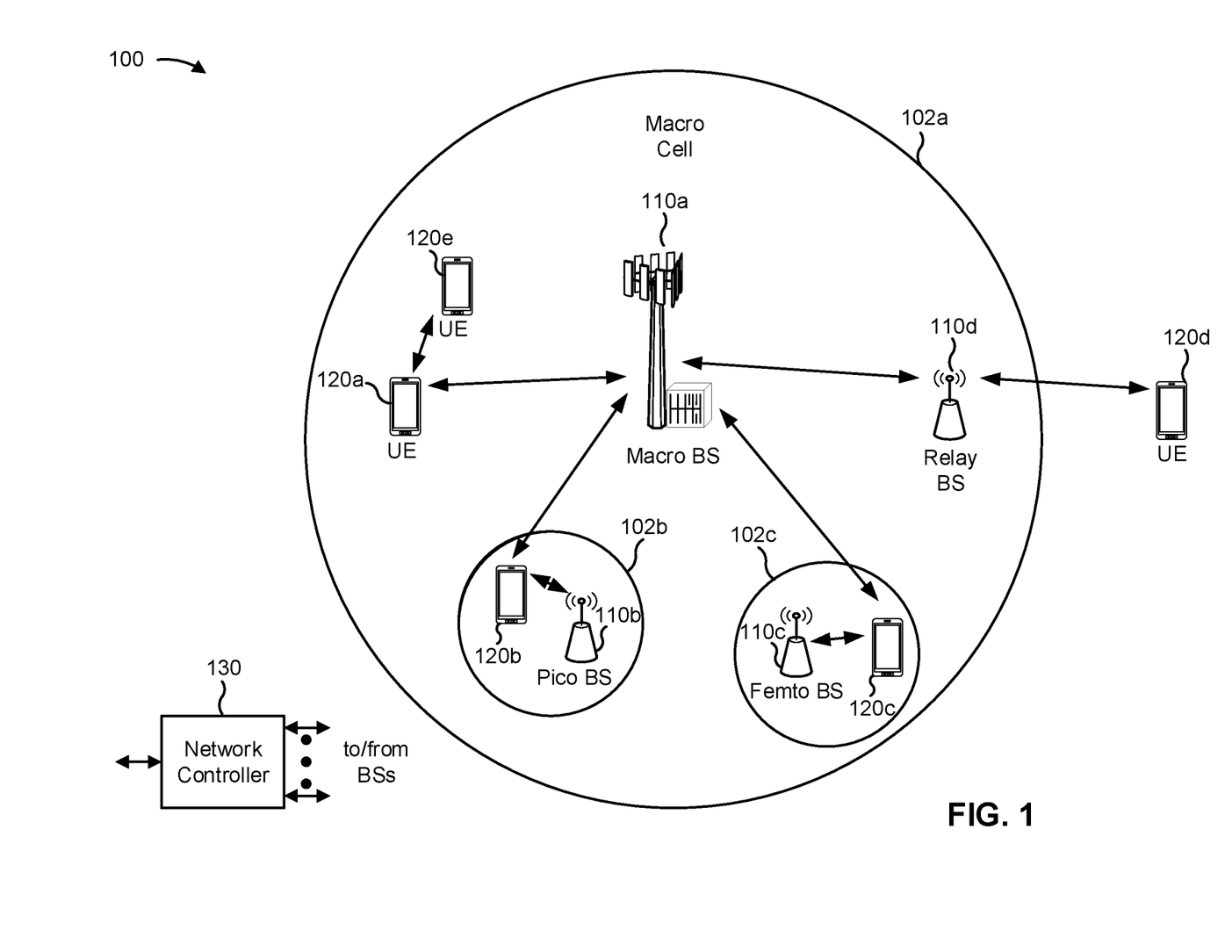
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
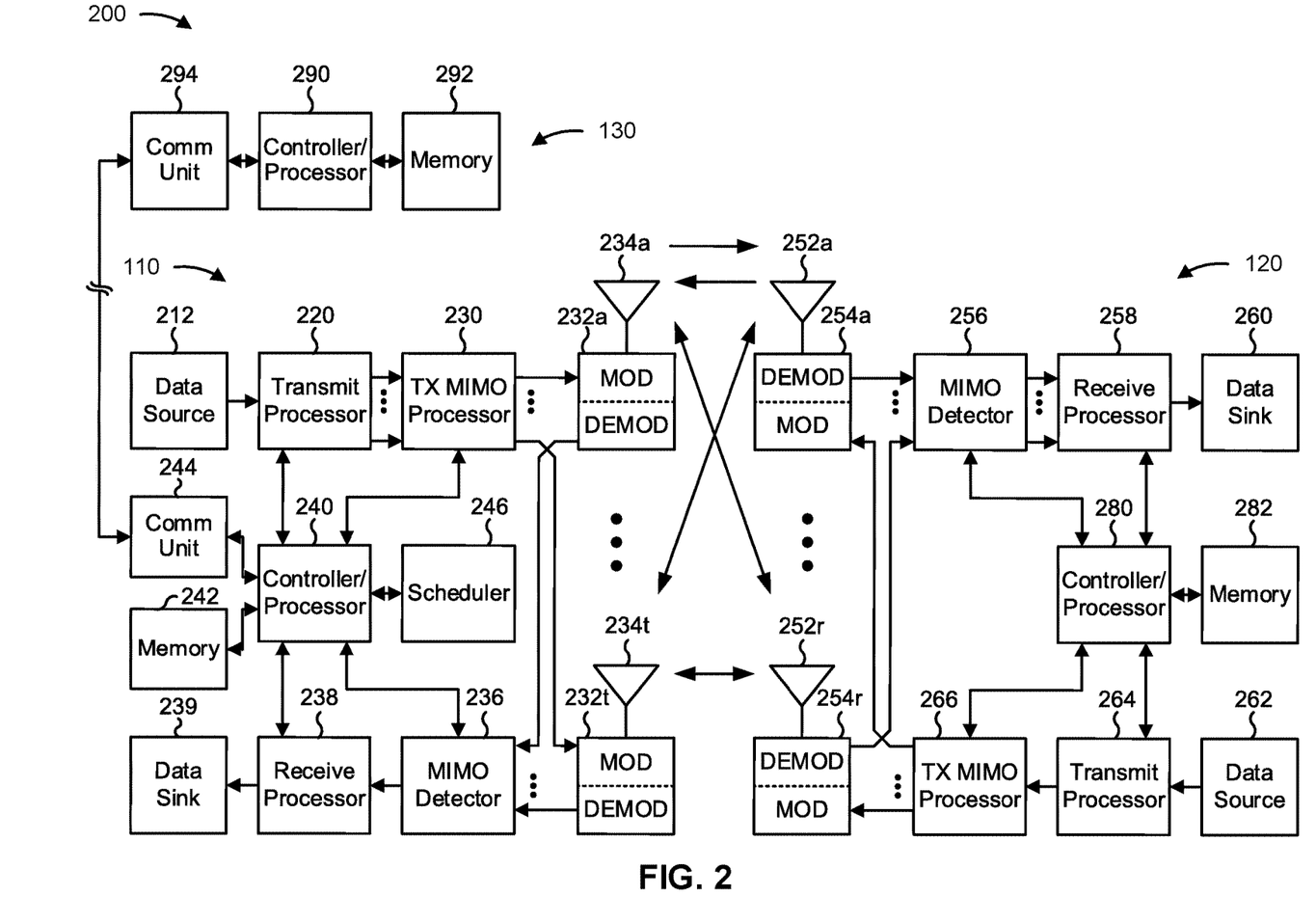
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like), and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling and MAC options for preempted scheduling requests, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that processing or transmission associated with a scheduling request is preempted; means for performing one or more scheduling request preemption actions, associated with the scheduling request, based at least in part on determining that the processing or transmission is preempted; and/or the like. In some aspects, such means may include one or more components of UE 120 described in connection with FIG. 2.

As indicated above, FIG. 2 is provided as an example. Other examples may differ from what is described with regard to FIG. 2.

In a wireless communication system, such as an NR system, a scheduling request (SR) may be used for requesting uplink resources (e.g., uplink shared channel (UL-SCH) resources) for transmitting of an uplink communication. A UE (e.g., a medium access control (MAC) entity of a UE 120) may be configured with a set of SR configurations. An SR configuration may include a set of physical uplink control channel (PUCCH) resources to be used for transmitting an SR in a given bandwidth part (BWP) and cell. For a logical channel, at most one PUCCH resource for SR may be configured per BWP. Each SR configuration may correspond to one or more logical channels, and each logical channel may be mapped to zero or one SR configurations. For each SR configuration, one or more parameters associated with an SR procedure may be configured. Such parameters may include a prohibition timer (e.g., sr-ProhibitTimer), an SR transmission threshold (e.g., sr-TransMax), and/or the like. The UE (e.g., the MAC entity of UE 120) may be configured to maintain one or more variables associated with the SR configuration, such as an SR counter (e.g., SR COUNTER).

For a pending SR, the UE (e.g., the MAC entity of UE 120) may perform the following procedure: if there is no valid PUCCH resource configured for the pending SR, the MAC entity may initiate a random access procedure (e.g., on a special cell (SpCell)) and cancel the pending SR. Otherwise, for the SR configuration corresponding to the pending SR, the MAC entity may determine whether (1) the MAC entity has an SR transmission occasion on a valid PUCCH resource for the configured SR, (2) a prohibition timer is not running at the time of the SR transmission occasion, (3) the PUCCH resource for the SR transmission occasion does not overlap with a measurement gap, (4) the PUCCH resource for the SR transmission occasion does not overlap with an UL-SCH resource, and (5) the SR counter is less than the SR transmission threshold. If these conditions are satisfied, then the MAC entity may increment the SR counter by 1, instruct a physical (PHY) layer of the UE to signal the SR on a valid PUCCH resource for SR, and start the prohibition timer.

In some cases, an SR may need to be preempted after the decision by the UE to signal the SR is made in the manner described above. For example, an SR for mobile broadband (MBB) traffic (e.g., over a long-duration PUCCH) may need to be preempted in order for the UE to transmit (comparatively more urgent) ultra-reliable low-latency (URLLC) traffic. However, as described above, a decision to transmit an SR may be accompanied by the following actions by the UE (e.g., the MAC entity of the UE): starting a prohibition timer for the SR configuration associated with the SR, and incrementing the SR counter for the SR configuration by 1. As another example, an SR for MBB traffic may need to be preempted in order for the UE to transmit uplink control information (UCI) for URLLC traffic.

Some aspects described herein provide signaling and MAC options for preempted SRs. More particularly, some aspects described herein provide techniques and apparatuses associated with performing one or more SR preemption actions, associated with an SR, based at least in part on determining that processing or transmission associated with the SR is preempted.

Figure 3:
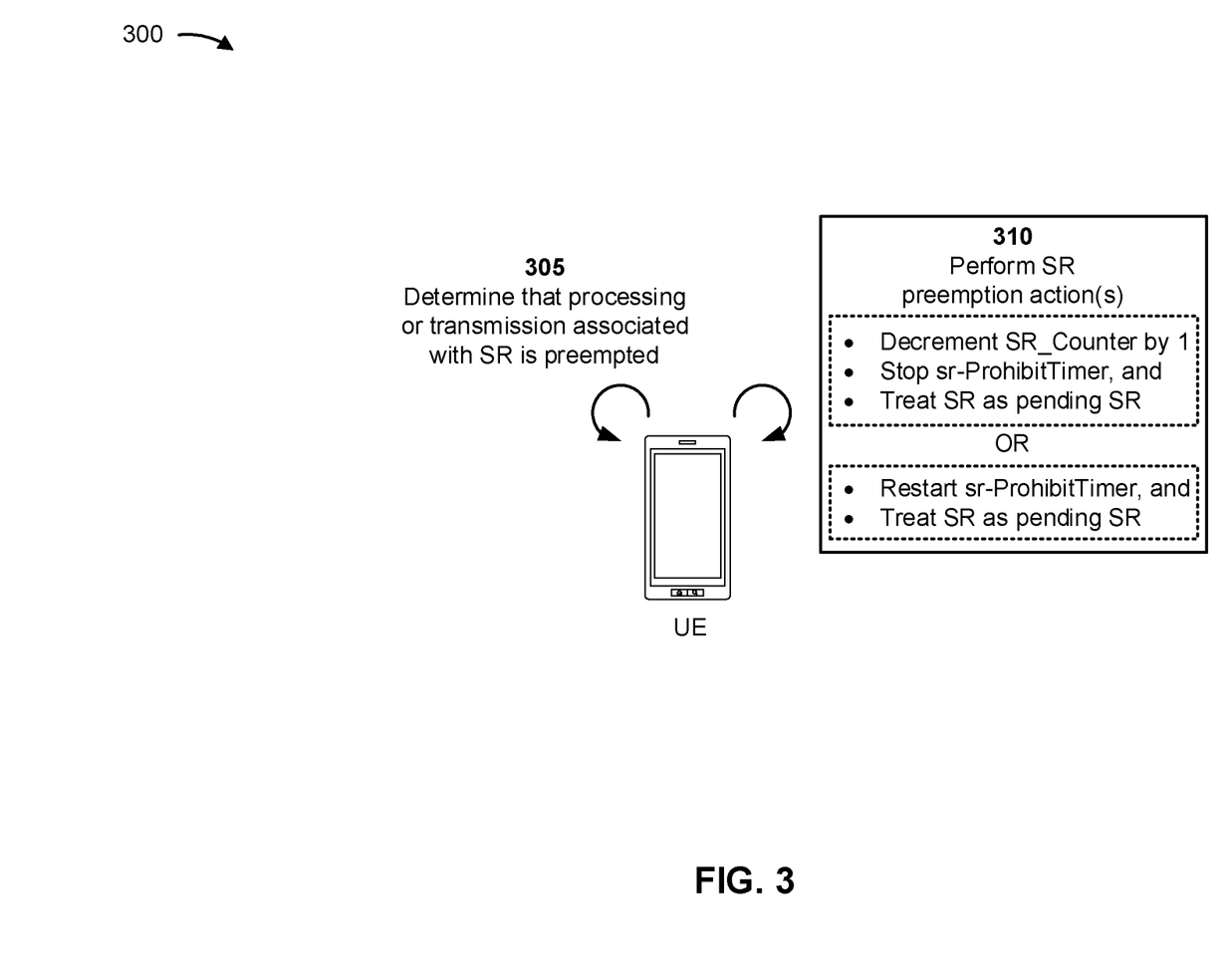
FIG. 3 is a diagram illustrating an example associated with signaling and medium access control options for preempted scheduling requests, in accordance with various aspects of the present disclosure.

FIG. 3 is a diagram illustrating an example 300 associated with signaling and medium access control options for preempted scheduling requests, in accordance with various aspects of the present disclosure.

In FIG. 3, a UE (e.g., a MAC entity of UE 120) has determined that an SR, associated with an SR configuration, is to be transmitted. For example, the UE may trigger an SR procedure for MBB (e.g., an SR procedure associated with transmitting MBB and/or enhanced MBB (eMBB) data). Based at least in part on this determination, the UE has incremented an SR counter for the SR configuration, instructed a PHY layer of the UE to signal the SR on a valid PUCCH resource, and started a prohibition timer for the SR configuration, as described above.

Further, for the purposes of FIG. 3, the UE (e.g., the PHY layer of the UE) has decided to preempt the SR. Such a decision may be made when, for example, the UE determines that the UE is to transmit higher priority data than data associated with the SR, and the UE has been scheduled to transmit the higher priority data. As a particular example, if the SR is associated with transmitting MBB data, and the UE determines that the UE is to transmit URLLC data and has received an uplink grant for transmitting the URLLC data, then the UE may decide to preempt the SR. In other words, the UE may detect availability of URLLC traffic for uplink transmission, and may decide to preempt the SR procedure for MBB. In some aspects, the decision to preempt the SR may be made based at least in part on information provided by a base station (e.g., base station 110). For example, if the base station schedules a dynamic grant to schedule high priority data, and the dynamic grant uses SR resources or the dynamic grant resources overlap in time with the SR resources, then the UE may decide to preempt the SR based at least in part on the information provided by the base station. Notably, there are numerous techniques based at least in part on which the UE may decide to preempt an SR, and the examples provided above are provided for illustrative purposes only. In some aspects, the decision to preempt the SR may be made by the PHY layer of the UE and/or by the MAC entity of the UE.

As shown in FIG. 3, and by reference number 305, the UE may determine that processing or transmission associated with an SR is preempted. For example, the UE (e.g., the MAC entity of the UE) may determine that the processing or transmission associated with the SR is preempted based at least in part on the decision to preempt the SR (e.g., the decision by the PHY layer of the UE and/or by the MAC entity of the UE).

In some aspects, the UE may determine that the processing or transmission associated with an SR is preempted based at least in part on an indication from the PHY layer of the UE to the MAC entity of the UE. For example, when the PHY layer of the UE decides to preempt the SR, the PHY layer may provide, to the MAC entity of the UE, an indication that the SR is preempted. Here, based at least in part on the indication from the PHY layer to the MAC entity, the MAC entity may determine that the processing or transmission of the SR is preempted. In some aspects, the indication may include an SR configuration identifier associated with the SR (e.g., such that the MAC entity can identify the SR configuration associated with the preempted SR). Thus, in some aspects, the UE may perform one or more SR preemption actions based at least in part on an indication from the PHY layer to the MAC layer. As used herein, processing associated with the SR comprises any processing steps to be performed after the decision to transmit the SR in association with transmitting the SR (i.e., processing steps needed to prepare for the actual transmission of the SR), while transmission associated with the SR comprises the transmission of the SR.

As further shown in FIG. 3, and by reference 310, the UE may perform one or more SR preemption actions, associated with the SR, based at least in part on determining that the processing or transmission is preempted.

In some aspects, the one or more SR preemption actions may include decrementing an SR counter for the SR configuration associated with the SR. For example, the UE may decrement the SR counter (e.g., SR COUNTER) for the SR configuration by 1 (e.g., such that a value of the SR counter reverts to a value of the SR counter prior to the decision to transmit the SR).

In some aspects, the one or more SR preemption actions may include stopping an SR prohibition timer for the SR configuration associated with the SR. For example, the UE may stop the prohibition timer (e.g., sr-ProhibitTimer) for the SR configuration (e.g., such that the SR prohibition timer stops at a current value).

In some aspects, the one or more SR preemption actions may include restarting the SR prohibition timer for the SR configuration associated with the SR. For example, UE may restart the prohibition timer (e.g., sr-ProhibitTimer) for the SR configuration (e.g., such that the SR prohibition timer returns to a value of zero).

In some aspects, the one or more SR preemption actions may include treating the SR as a pending SR. For example, the UE may treat the preempted SR as a pending SR (e.g., rather than treating the SR as a non-pending SR or canceling the SR).

In some aspects, the one or more SR preemption actions may include at least two SR preemption actions. In one example aspect, as indicated in FIG. 3, the UE may, based at least in part on determining that the processing or transmission of the SR is preempted, decrement the SR counter by 1, stop the SR prohibition timer, and treat the SR as a pending SR. In such a case, the MAC entity of the UE is effectively undoing the decision to transmit the SR and, therefore, may decide to transmit the SR again (e.g., in the manner described above) in association with transmitting the SR.

In another example aspect, as further indicated in FIG. 3, the UE may, based at least in part on determining that the processing or transmission of the SR is preempted, restart the SR prohibition timer and treat the SR as a pending SR. In such a case, the MAC entity of the UE is effectively treating the SR transmission instance as having failed, but is assuming that the PHY layer can attempt to transmit the SR at another opportunity (e.g., a later PUCCH resource).

In some aspects, the UE may transmit the SR based at least in part on the one or more SR preemption actions. For example, after performing the one or more SR preemption actions, the UE may transmit the SR.

As indicated above, FIG. 3 is provided as an example. Other examples may differ from what is described with respect to FIG. 3.

Figure 4:
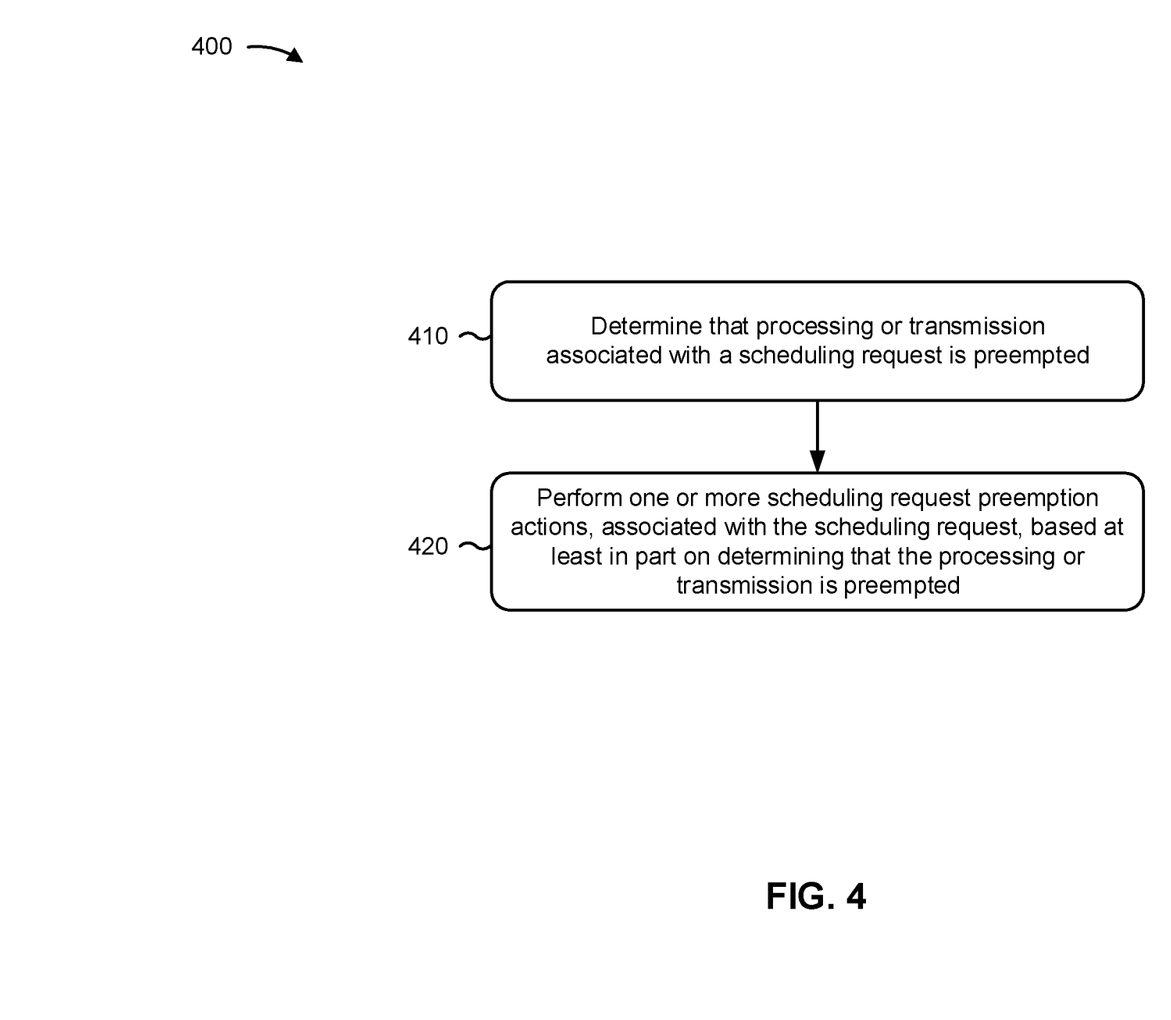
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with signaling and medium access control options for preempted scheduling requests.

As shown in FIG. 4, in some aspects, process 400 may include determining that processing or transmission associated with a scheduling request is preempted (block 410). For example, the UE (e.g., using receive processor 258, transmit processor 264, controller/processor 280, memory 282, and/or the like) may determine that processing or transmission associated with a scheduling request is preempted, as described above.

As further shown in FIG. 4, in some aspects, process 400 may include performing one or more scheduling request preemption actions, associated with the scheduling request, based at least in part on determining that the processing or transmission is preempted (block 420). For example, the UE (e.g., using receive processor 258, transmit processor 264, controller/processor 280, memory 282, and/or the like) may perform one or more scheduling request preemption actions, associated with the scheduling request, based at least in part on determining that the processing or transmission is preempted, as described above.

Process 400 may include additional aspects, such as any single aspect or any combination of aspects described below and/or in connection with one or more other processes described elsewhere herein.

In a first aspect, the one or more scheduling request preemption actions include decrementing a scheduling request counter. Here, the scheduling request counter may be for a scheduling request configuration associated with the scheduling request.

In a second aspect, alone or in combination with the first aspect, the one or more scheduling request preemption actions include stopping a scheduling request prohibition timer. Here, the scheduling request prohibition timer may be for a scheduling request configuration associated with the scheduling request.

In a third aspect, alone or in combination with one or more of the first and second aspects, the one or more scheduling request preemption actions include restarting a scheduling request prohibition timer. Here, the scheduling request prohibition timer may be for a scheduling request configuration associated with the scheduling request.

In a fourth aspect, alone or in combination with one or more of the first through third aspects, the one or more scheduling request preemption actions include treating the scheduling request as a pending scheduling request.

In a fifth aspect, alone or in combination with one or more of the first through fourth aspects, the one or more scheduling request preemption actions are performed based at least in part on an indication from a physical layer of the UE. Here, the indication may include a scheduling request configuration identifier associated with the scheduling request.

In a sixth aspect, alone or in combination with one or more of the first through fifth aspects, the one or more scheduling request preemption actions are performed based at least in part on an indication to a medium access control layer of the UE. Here, the indication may include a scheduling request configuration identifier associated with the scheduling request.

In a seventh aspect, alone or in combination with one or more of the first through sixth aspects, determining that the processing or transmission associated with the scheduling request is preempted comprises triggering a scheduling request procedure for mobile broadband (MBB), detecting availability of ultra-reliable low-latency communication (URLLC) traffic for uplink transmission, and preempting the scheduling request procedure for MBB.

In an eighth aspect, alone or in combination with one or more of the first through seventh aspects, the UE may transmit the scheduling request (e.g., the scheduling request for MBB) based at least in part on the one or more scheduling request preemption actions.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that processing or transmission associated with a scheduling request is preempted; and
   performing one or more scheduling request preemption actions, associated with the scheduling request, based at least in part on determining that the processing or transmission associated with the scheduling request is preempted,
   wherein the one or more scheduling request preemption actions include resetting a scheduling request prohibition timer, the scheduling request prohibition timer being for a scheduling request configuration associated with the scheduling request.

2. The method of claim 1, wherein the one or more scheduling request preemption actions further include stopping the scheduling request prohibition timer.

3. The method of claim 1, wherein the one or more scheduling request preemption actions further include decrementing a scheduling request counter,
   wherein the scheduling request counter is for the scheduling request configuration.

4. The method of claim 1, wherein the one or more scheduling request preemption actions further include treating the scheduling request as a pending scheduling request.

5. The method of claim 1, wherein determining that the processing or transmission associated with the scheduling request is preempted comprises:
   triggering a scheduling request procedure for mobile broadband (MBB);

detecting availability of ultra-reliable low-latency communication (URLLC) traffic for uplink transmission; and preempting the scheduling request procedure for MBB.

6. The method of claim 1, further comprising transmitting the scheduling request based at least in part on the one or more scheduling request preemption actions.

7. The method of claim 1, wherein the one or more scheduling request preemption actions are performed based at least in part on an indication from a physical layer of the UE, wherein the indication includes a scheduling request configuration identifier associated with the scheduling request.

8. The method of claim 1, wherein the one or more scheduling request preemption actions are performed based at least in part on an indication to a medium access control layer of the UE, wherein the indication includes a scheduling request configuration identifier associated with the scheduling request.

9. A user equipment (UE) for wireless communication, comprising:

a memory; and one or more processors coupled to the memory, the one or more processors configured to:

determine that processing or transmission associated with a scheduling request is preempted; and perform one or more scheduling request preemption actions, associated with the scheduling request, based at least in part on determining that the processing or transmission associated with the scheduling request is preempted, wherein the one or more scheduling request preemption actions include resetting a scheduling request prohibition timer, the scheduling request prohibition timer being for a scheduling request configuration associated with the scheduling request.

10. The UE of claim 9, wherein the one or more scheduling request preemption actions further include stopping the scheduling request prohibition timer.

11. The UE of claim 9, wherein the one or more scheduling request preemption actions further include decrementing a scheduling request counter, wherein the scheduling request counter is for the scheduling request configuration.

12. The UE of claim 9, wherein the one or more scheduling request preemption actions further include treating the scheduling request as a pending scheduling request.

13. The UE of claim 9, wherein the one or more processors, when determining that the processing or transmission associated with the scheduling request is preempted, are configured to:

trigger a scheduling request procedure for mobile broadband (MBB);

detect availability of ultra-reliable low-latency communication (URLLC) traffic for uplink transmission; and preempt the scheduling request procedure for MBB.

14. The UE of claim 9, wherein the one or more processors are further configured to transmit the scheduling request based at least in part on the one or more scheduling request preemption actions.

15. The UE of claim 9, wherein the one or more scheduling request preemption actions are performed based at least in part on an indication from a physical layer of the UE, wherein the indication includes a scheduling request configuration identifier associated with the scheduling request.

16. The UE of claim 9, wherein the one or more scheduling request preemption actions are performed based at least in part on an indication to a medium access control layer of the UE, wherein the indication includes a scheduling request configuration identifier associated with the scheduling request.

17. A non-transitory computer-readable medium storing one or more instructions for wireless communication, the one or more instructions comprising:

one or more instructions that, when executed by one or more processors of a user equipment (UE), cause the one or more processors to:

determine that processing or transmission associated with a scheduling request is preempted; and perform one or more scheduling request preemption actions, associated with the scheduling request, based at least in part on determining that the processing or transmission associated with the scheduling request is preempted, wherein the one or more scheduling request preemption actions include resetting a scheduling request prohibition timer, the scheduling request prohibition timer being for a scheduling request configuration associated with the scheduling request.

18. The non-transitory computer-readable medium of claim 17, wherein the one or more scheduling request preemption actions further include stopping the scheduling request prohibition timer.

19. The non-transitory computer-readable medium of claim 17, wherein the one or more scheduling request preemption actions further include decrementing a scheduling request counter, wherein the scheduling request counter is for the scheduling request configuration.

20. The non-transitory computer-readable medium of claim 17, wherein the one or more scheduling request preemption actions include treating the scheduling request as a pending scheduling request.

21. The non-transitory computer-readable medium of claim 17, wherein the one or more instructions, when causing the one or more processors to determine that the processing or transmission associated with the scheduling request is preempted, cause the one or more processors to:

trigger a scheduling request procedure for mobile broadband (MBB);

detect availability of ultra-reliable low-latency communication (URLLC) traffic for uplink transmission; and preempt the scheduling request procedure for MBB.

22. The non-transitory computer-readable medium of claim 17, wherein the one or more instructions further cause the one or more processors to transmit the scheduling request based at least in part on the one or more scheduling request preemption actions.

23. The non-transitory computer-readable medium of claim 17, wherein the one or more scheduling request preemption actions are performed based at least in part on an indication from a physical layer of the UE, wherein the indication includes a scheduling request configuration identifier associated with the scheduling request.

24. The non-transitory computer-readable medium of claim 17, wherein the one or more scheduling request preemption actions are performed based at least in part on an indication to a medium access control layer of the UE,
 wherein the indication includes a scheduling request configuration identifier associated with the scheduling request.

25. An apparatus for wireless communication, comprising:
 means for determining that processing or transmission associated with a scheduling request is preempted; and
 means for performing one or more scheduling request preemption actions, associated with the scheduling request, based at least in part on determining that the processing or transmission associated with the scheduling request is preempted,
  wherein the one or more scheduling request preemption actions include resetting a scheduling request prohibition timer, the scheduling request prohibition timer being for a scheduling request configuration associated with the scheduling request.

26. The apparatus of claim 25, wherein the one or more scheduling request preemption actions further include stopping the scheduling request prohibition timer.

27. The apparatus of claim 25, wherein the one or more scheduling request preemption actions further include decrementing a scheduling request counter,
 wherein the scheduling request counter is for the scheduling request configuration.

28. The apparatus of claim 25, wherein the one or more scheduling request preemption actions include treating the scheduling request as a pending scheduling request.

29. The apparatus of claim 25, wherein the means for determining that the processing or transmission associated with the scheduling request is preempted comprises:
 means for triggering a scheduling request procedure for mobile broadband (MBB);
 means for detecting availability of ultra-reliable low-latency communication (URLLC) traffic for uplink transmission; and
 means for preempting the scheduling request procedure for MBB.

30. The apparatus of claim 25, further comprising means for transmitting the scheduling request based at least in part on the one or more scheduling request preemption actions.

31. The apparatus of claim 25, wherein the one or more scheduling request preemption actions are performed based at least in part on an indication from a physical layer of the apparatus,
 wherein the indication includes a scheduling request configuration identifier associated with the scheduling request.

32. The apparatus of claim 25, wherein the one or more scheduling request preemption actions are performed based at least in part on an indication to a medium access control layer of the apparatus,
 wherein the indication includes a scheduling request configuration identifier associated with the scheduling request.

* * * * *